United States Patent [19]

Russell et al.

[11] Patent Number: 4,941,726

[45] Date of Patent: Jul. 17, 1990

[54] TAPERED FIBER AMPLIFIER

[75] Inventors: Stephen D. Russell, San Diego; Timothy C. Stamnitz, Encinitas, both of Calif.

[73] Assignee: The Unites States of America as represented by the Secretary of the Navy, Washington, D.C.

[21] Appl. No.: 239,158

[22] Filed: Aug. 31, 1988

[51] Int. Cl.$^5$ .............................. G02B 6/26; G02B 7/42
[52] U.S. Cl. ................................. 350/96.15; 350/96.16; 372/3; 372/6
[58] Field of Search ...................... 372/3, 6; 350/96.15, 350/96.16

[56] References Cited

U.S. PATENT DOCUMENTS

| | | | |
|---|---|---|---|
| 4,342,499 | 8/1982 | Hicks, Jr. | 350/95.15 |
| 4,557,553 | 12/1988 | McLandrich | 350/96.15 |
| 4,616,887 | 10/1986 | Hicks, Jr. | 350/96.15 |
| 4,674,830 | 6/1987 | Shaw et al. | 350/96.15 |
| 4,676,583 | 6/1987 | Hicks | 350/96.15 |
| 4,699,452 | 10/1987 | Mollenauer et al. | 350/96.15 |
| 4,723,824 | 2/1988 | Shaw et al. | 350/96.15 |
| 4,729,621 | 3/1988 | Edelman | 350/96.15 |
| 4,740,974 | 4/1988 | Byron | 372/3 |

FOREIGN PATENT DOCUMENTS

| | | | |
|---|---|---|---|
| 0189196 | 7/1986 | European Pat. Off. | 372/3 |
| 0125919 | 5/1988 | Japan | 372/3 |

OTHER PUBLICATIONS

"Mode Conversion in Optical Fibers with Monotonically Increasing Core Radius", *Journal of Lightwave Technology*, vol. LT-5, No. 1, Jan. 1987.

"Optical Fiber Tapers-A Novel Approach to Self-Aligned Beam Expansion and Single-Mode Hardware", N. Amitay et al. *Journal of Lightwave Technology*, vol. LT-5, No. 1, Jan. 1987.

"Tapered-Beam Expander for Single-Mode Optical-Fiber Gap Devices", *Electronics Letters*, 16 Jan. 1986, vol. 22, No. 2.

Chapter 19 *Optical Waveguide Theory*, A. W. Snyder and J. D. Love, Chapman and Hall, London, New York (1983).

"Coupling Optical Waveguides by Tapers", Applied Optics, vol. 14, No. 12, Dec. 1975.

"Laser-Assisted Growth of Optical Quality Single Crystal Fibers", SPIE vol. 460, Processing of Guided Wave Opto-Electronic Materials (1984).

"1.064 and 1.32 Micron Nd-YAG Single Crystal Fiber Lasers", *Journal of Light Wave Technology*, vol. LT-4, No. 4, Apr. 1986.

"Nonlinear Optics in Fibers for Fiber Measurements and Special Device Functions", by C. Lin *Journal of Lightwave Technology* LT-4 pp. 103-115 (Aug. 1986).

"Stimulated Raman Scattering" in *Light Scattering in*

(List continued on next page.)

*Primary Examiner*—William L. Sikes
*Assistant Examiner*—Robert E. Wise
*Attorney, Agent, or Firm*—Harvey Fendelman; Thomas Glenn Keough

[57] ABSTRACT

A tapered optical fiber amplifier is designed to provide for long-distance, un-repeatered fiber optic communications. Two single-mode fiber portions are tapered to efficiently intensify and couple an information signal from a laser diode and a pump signal at a shorter wavelength into a fused, tapered single-mode fiber optic coupler. The concentrated information signal and concentrated pump signal are combined via the coupler which is coupled to a several-kilometer length of a relatively small core diametered single-mode fiber to create a nonlinear optical effect (stimulated Raman scattering) (SRS). The SRS causes Raman shift of the pump signal to amplify the information signal, resulting in amplified signals that are efficiently coupled out of the relatively small core diametered optical fiber with another single-mode optical fiber taper portion. The tapered fiber portions launch the signal and pump light into the small core diametered single-mode fiber length, thereby generating SRS to result in a signal amplification and an efficient extraction of the amplified signal via the tapered output fiber portion or pigtail.

8 Claims, 1 Drawing Sheet

OTHER PUBLICATIONS

*Solids*, Cardona M. (Springer-Verlog, Berlin, Heidleburg, New York, 1983) Chapter/, pp. 283–286.

"High-Power Gain-Guided InGaAsp Laser Array", by N. K. Dutta et al., *Applied Physics Letters*, vol. 45, No. 9, 1 Nov. 1984, pp. 940–943.

"CW Phase-Locked Array GaInAsP-InP High Power Semiconductor Laser Grown by Low-Pressure MOCVD", M. Razeghi et al., *Applied Physics Letters*, vol. 50, No. 5, 2 Feb. 1987, pp. 230–232.

"Nonlinear Properties of Optical Fibers", by R. H. Stolen, *Optical Fiber Telecommunications*, S. E. Miller and A. G. Chynoweth, Editors, Academic Press, 1979, pp. 125–150.

"A 1.4–4.0 Micron High-Energy Angle-Tuned LiNbO$_3$ Parametric Oscillator", by R. L. Herbst et al., *Applied Physics Letters*, vol. 25, No. 9, Nov. 1974, pp. 520–522.

*Introduction to Optical Electronics*, by A. Yariv (Holt, Rinehart & Winston), 2nd Ed., 1976, pp. 222–239.

"Phase-Matched Three-Wave Mixing in Silica Fiber Optical Waveguides", R. H. Stolen J. E. Bjorkholm, and A. Ashkin, *Applied Physics Letters*, vol. 24, No. 7, Apr. 1974, pp. 308–310.

"Optical Fiber Modes Using Stimulated Four-Photon mixing", R. H. Stolen and W. N. Leibolt, *Applied Optics*, vol. 15, No. 1, Jul. 1975, pp. 239–243.

"Efficient Large-Frequency-Shifted Three-Wave Mixing in Low Dispersion Wavelength Region in Single-Mode Optical Fiber", K. Washio et al., *Electronics Letters*, vol. 16, No. 17, Aug. 1980, pp. 658–660.

"Phase Matching in the Minimum-Chromatic-Dispersion Region of Single-Mode Fibers for Stimulated Four-Photon Mixing", Chinlon Lin et al., *Optics Letters, vol. 6, No. 10, Oct. 1981, pp. 493–495.*

"Designing Optical Fibers for Frequency Conversion and Optical Amplification by Stimulated Raman Scattering and Phase-Matched Four-Photon Mixing", by Chinlon Lin, *Journal of Optical Communications*, 4 (1), pp. 2–9, 1983.

"Raman and Four-Photon Mixing Amplification in Single-Mode Fibers", by J. P. Rochelle et al., *Optical Engineering*, vol. 24, No. 4, Jul.-Aug. 1985, pp. 600–608.

"Noise Properties of a Raman Amplifier", by N. Anders Olsson and J. Hegarty, *Jrnl. Lightwave Tech.*, vol. LT-4, No. 4, Apr. 1986, pp. 396–399.

"Simultaneous Forward and Backward Raman Scattering in Low-Attenuation Single-Mode Fibers", by K. Vilhelmsson, *Jrnl. Lightwave Tech.*, vol. LT-4, No. 4, Apr. 1986, pp. 400–404.

"Spontaneous and Stimulated Raman Scattering in Long Low Loss Fibers", by J. Auyeung and A. Yariv, *IEEE Jrnl. Quan. Elec.*, vol. QE-14, No. 5, May 1978, pp. 347–352.

"Theory of CW Raman Oscillation in Optical Fibers", by J. Auyeung and A. Yariv, *J. Opt. Soc. Am.*, vol. 69, No. 6, Jun. 1979, pp. 803–807.

TAPERED FIBER AMPLIFIER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This application is related to co-pending U.S. patent application Ser. No. 242,466 and U.S. Pat. No. 4,867,518 for Mode Field Conditioner and All Fiber Stimulated Four Photon Mixing (SFPM) Amplifier, respectively.

BACKGROUND OF THE INVENTION

Heretofore, intrinsic losses in optical fibers have called for the use of complicated electro-optic and/or opto-electronic repeaters to amplify the optical signals in long-haul communications links (usually those greater than approximately 70 kilometers in length). Repeaterless links are more desirable, however, since they are less expensive and help assure more reliable systems. Cost and reliability become even more important factors in the realm of undersea communications, since repeaterless links relieve the initial expense of the repeaters, but also the recovery and servicing expenses associated with the optical repeaters.

Thus a continuing need exists in the state of the art for a long-haul communications link not requiring interspersed repeaters, yet which will provide meaningful data at usable signal levels at a receiving station.

SUMMARY OF THE INVENTION

The present invention is directed to providing an amplifier using tapered fiber portions for a long-haul single-mode optical fiber communications link, which relies upon stimulated Raman amplification of the signal within at least a predetermined length coupled to the transmitting fiber link. Light is launched into a relatively small diametered core of the predetermined length of a single-mode fiber using tapered fiber portions. A subsequent extraction of an amplified signal is made from a tapered fiber pigtail which is coupled to the long haul link which has a larger diametered core. The launched light, including optical data and optical pump light from a pump source, is combined by a wavelength selective single-mode fiber coupler, interacts over the predetermined length of the small core diametered single-mode fiber to amplify the data signal wavelength in accordance with stimulated Raman scattering. A tapered optical fiber pigtail portion couples the amplified signals from the small diametered core length to the long haul link.

An object of the invention is to generate stimulated Raman scattering in a relatively small diametered core of predetermined length connected to a communication link which results in signal amplification of a transmitted signal.

Another object is to provide for the use of tapered fiber portions to launch an information signal and a pump signal into a length of single-mode fiber, thereby generating stimulated Raman scattering therein for the consequent signal amplification and extraction.

Yet another object is to provide for using a tapered fiber technique which produces an increase in power density in a relatively small core diametered single-mode fiber for amplification.

Still another object is to increase the coupling efficiency between pump and signal sources and a single-mode fiber link due to the inclusion of tapered fiber portions.

Still another object is to provide an efficient method for combining the pump and signal lights for injection into the predetermined length of fiber for signal amplification.

Still another object is to provide an amplification technique for a single-mode communications link that is suitable for field applications by reason of the method of combining the pump and signal light to achieve increased power densities.

Another object is to provide for increased extraction efficiency of a signal wavelength using a tapered fiber pigtail.

Still another object is to reduce the susceptibility to damage of a fiber face of a single-mode transmission link, other-wise caused by an inefficient launching of high-power pump light.

Still another object is to permit field installation of an optical fiber amplifier without conventional laboratory (optical bench) hardware by using tapered fiber pigtails at the input ports of a wavelength selective, single-mode fiber optic coupler.

These and other objects of the invention will become more readily apparent from the ensuing specification, when taken in conjunction with the appended claims and drawings.

DESCRIPTION OF THE PREFERRED EMBODIMENT

Figure 1:
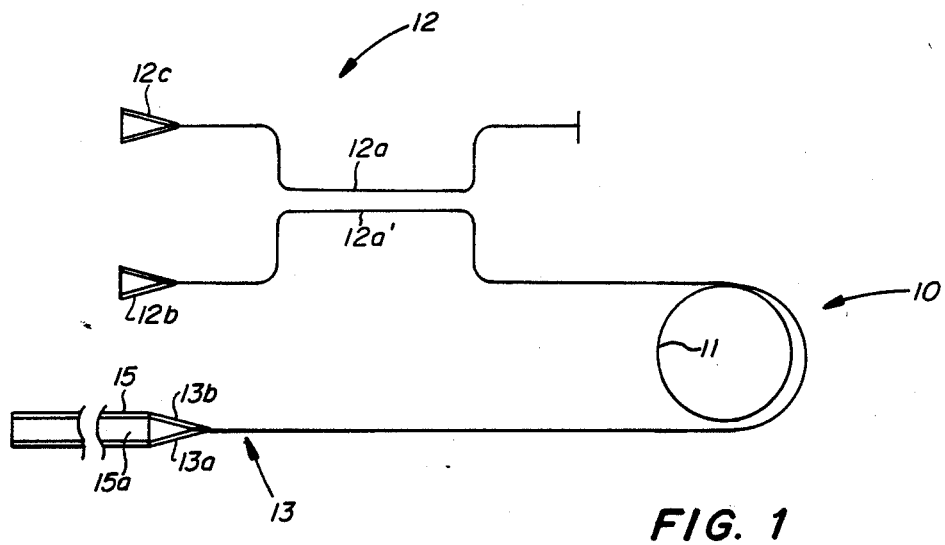
FIG. 1 depicts a tapered fiber amplifier having the capability for improving the reliability of long-haul single-mode communications.

Referring now to the drawing, a tapered fiber amplifier 10 includes a length L of a single-mode fiber that has a relatively small core diameter of approximately 2-3 microns, and which continuously extends the length L of about several kilometers (where L approximately equals $1/\alpha$, with $\alpha$ equaling the attenuation coefficient of the fiber at $\lambda_S$).

An optical source S1 feeds optical data at a wavelength $\lambda_S$ into one end of the length L of continuously extending single-mode fiber for signal amplification which is optically coupled into an input end 15 of a long haul single-mode communications link having a larger core diameter 15a of about 8 to 10 microns. A detector D or utilizing equipment is located at the output end of the link as desired.

A fiber coupler 12 is provided at the input end of fiber length L and includes a portion 12a which may be substantially identical to the single-mode fiber of length L, although it and other parts of coupler 12 could be larger single-mode fiber, in which case a tapered fiber portion may be needed to join the coupler to length L. A tapered fiber portion 12b of coupler 12 enables the entry of optical data at the wavelength $\lambda_S$ coming from source S1 into length L. Another tapered fiber section 12c is provided to serve for the entry of energy from optical pump S2 at a wavelength $\lambda_P$ into length L.

The two tapered optical fiber portions 12b and 12c are fabricated by reducing preforms in the conventional drawing process, as has been recently reported in the article entitled "Optical Fiber Tapers- A Novel Approach to Self Aligned Beam Expansion and Single Mode Hardware" by N. Amitay et al. in the *Journal of Lightwave Technology*, LT-5 (1), pages 70-76 (January 1987). The tapers are critical to the design of this inventive concept and come within the slowness criteria outlined in Chapter 19 of the publication *Optical Waveguide Theory* by A. W. Snyder and J. D. Love, Chapman and Hall, London, New York (1983). Snyder et al.'s "slowness criteria" is adhered to so as not to disturb single-mode and induce energy loss. The exact fabrication steps for the taper are not critical.

A similarly designed tapered optical fiber pigtail 13 is provided at the receiver end at the input to the long haul communications link 15 to extract the amplified signal at the desired wavelength $\lambda_S$. A tapered fiber portion 13a of the pigtail is shaped with an appropriate length 13b for acceptable transmission characteristics in accordance with the Snyder et al. publication.

The fiber coupler is a wavelength selective coupler design for total power coupling of both the energy of S1 and S2 into fiber 11. With the exception of the tapered fiber portions, 12b and 12c, the fiber coupler is a well-established design, for example, such as that disclosed in U.S. Pat. No. 4,557,553 issued to Matthew N. McLandrich and entitled "Method of Wavelength Multiplexing in Fused Single-Mode Fiber Couplers". Two fibers 12a and 12a' are held together in an abutting side-by-side relationship, fused together, and elongated to produce the desired optical coupling characteristics between the fibers. The techniques for coupler fabrication are well-established and the exact manner by which these fabrication steps are performed is not critical for a thorough understanding of this inventive concept.

The phenomenon of stimulated Raman scattering (SRS) and its application to signal amplification also is well-understood and documented. The theory is covered in detail in several texts and publications, one of which being the article entitled "Nonlinear Optics in Fibers for Fiber Measurements and Special Device Functions" by C. Lin, in the *Journal of Lightwave Technology*, LT-4 (8), pages 1103-1115 (August 1986). The relevant theory points out that the amplification depends on the input power density, the effective gain length and the Raman gain coefficient. The latter two factors are composition dependent for the fiber link in use.

The signal wavelength $\lambda_S$ is governed by the desire to operate at "preferred windows" in optical communication data links, such as the minimum in dispersion at 1.3 microns or minimum in attenuation at 1.5 microns. The pump wavelength $\lambda_P$ is predetermined by available high power sources such as a ND:YAG laser operating at $\lambda_P$ equal to 1.06 microns. The optical pulses from source S1 and S2 are simultaneously coupled into fiber taper portions 12b and 12c. The optical pulses are concentrated to much higher intensities in the tapered portions and interact over the length L. This results in the depleting of energy from the pump wavelength $\lambda_P$ and amplifying the signal wavelength $\lambda_S$.

Using a standard silica core optical fiber with a peak in the Raman gain coefficient at 460 centimeters$^{-1}$, a pump wavelength of 1.06 microns and a signal wavelength of 1.3 microns, amplification occurs with the generation of the fourth Stokes line in the fiber length L. The subsequently amplified light will not require repeaters over a long-haul optical transmission link of several hundred kilometers.

The use of tapered fibers to launch the signal and pump beams into the single-mode fiber link generates stimulated Raman scattering (SRS) to result in signal amplification. The amplified signal is coupled efficiently out of length L to communications link 15 using the tapered pigtail 13.

A decreased core diameter in tapered portions 12b and 12c can range from a single-mode fiber diameter of about 8 or 10 microns to a smaller single-mode fiber core diameter of approximately 2 microns can demonstrate this concept. This arrangement will produce a considerable increase in power density in the similarly small core diametered single-mode fiber of length L, thereby increasing the amplifier's gain. In other words, the power coming into each tapered fiber portion via tapers 12b and 12c from 8-10 microns down to 2-3 microns intensifies the input light to further stimulate SRS. Conventional coupling (with lenses) into such a small core fiber has been shown to be extremely difficult and is not practical for field applications.

The selected fiber for signal amplification L has a relatively small diameter to assure a concentration of light intensity from the signal source and the pump source, but the exact diameters of both signal amplification and signal transmission fibers may be varied over a wide range; the ratio of the diameters of amplification and transmission fibers is typically less than one. The combined magnitudes of the separate intensities, which is further intensified by the tapered fiber portions, assures that the SRS phenomena is effected in the length L of the 2-3 microns fiber. The length L, the fiber for signal amplification, usually has a length of a few kilometers to tens of kilometers within which the amplification occurs. After amplification in the length L, the amplified signals are recoupled to a suitable long-haul communications link 15 via the tapered pigtail section 13. The tapered pigtail section, which is fused to or an integral part of the length L of the fiber for signal amplification, has a 2-3 microns input and is tapered or flared outwardly to an 8 to 10 micron dimension to accommodate the 8 to 10 micron core of the long-haul communication link 15. The interconnection between the length L for signal amplification to the long-haul communication link 15 is made at the tapered fiber pigtail 13 at or near the place where the signals are amplified or at some distance in transit toward a destination through a long haul link 15 to a detector D. The fiber core composition is variable by adding dopant atoms during the fabrication process or by utilizing a substantially different composition (non-silica) for the core. Different densities of optical phonon states would result and may allow amplification of wavelengths otherwise excluded by the phonon dispersion in standard silica fibers. The use of fiber tapers to launch and extract the optical signals in these cases also would result in increased amplifier gain.

A significantly increased coupling efficiency between the pump and signal sources and the single-mode fiber link is due to the relaxation of alignment constraints which would otherwise involve transverse, axial and angular displacements. Sensitivity to end surface quality and contamination is somewhat relaxed to make this approach even more suitable for field applications. As a consequence, increased power densities are provided for in the single-mode fiber link as compared to conventional methods of launching the input beams. This further increases the amplifier's gain.

An increased extraction efficiency of the signal wavelength $\lambda_S$ using tapered fiber pigtail 13 relaxes the alignment constraints otherwise associated with aligning a 2–3 microns link core diameter with a larger diametered core or a detector.

The preferred method by which individual portions are joined or "optically coupled" for a ruggedized, field/undersea deployable amplifier would likely utilize the technique of fusion splicing which is well established in the art of fiber coupling.

Figure 2:
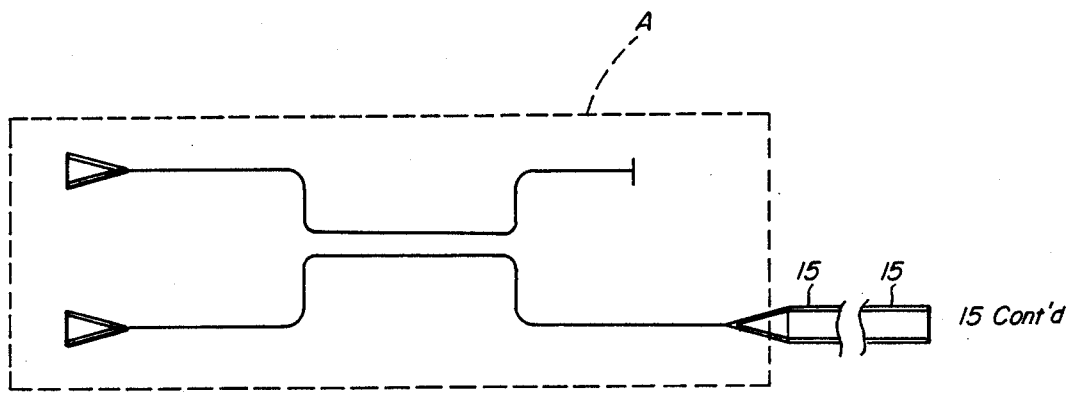
FIG. 2 shows a variation of this concept.

Alternate pump sources S2 could be selected to allow for the amplification of different signal wavelengths without a need to change the fiber optical composition. In addition, interchanging the signal wavelength source S1 with detector D could result in an amplification described as "backward" Raman amplification as referred to in the above identified C. Lin publication. In addition, simultaneous forward and backward Raman amplification may be achieved by including appropriate couplers with attached pump lasers at both ends of the transmission link (see the arrangement A in FIG. 2 which could be added onto FIG. 1).

Obviously, many modifications and variations of the present invention are possible in the light of the above teachings. It is therefore to be understood that within the scope of the appended claims, the invention may be practiced otherwise than as specifically described.

What is claimed is:

1. An apparatus for amplifying data signals comprising:
    a first tapered optical portion optically coupled to receive the data signals at an input end, and having a light transmission portion interposed between the input end and an output end, the first tapered optical portion being fabricated so as not to disturb single-mode and the input end has a greater area than the output end, thereby concentrating the data signal intensity therethrough;
    a source of optical pump signals;
    a second tapered optical portion optically coupled to receive the optical pump signals at an input end and having a light transmissive portion interposed between the input end and an output end, the second tapered optical portion being fabricated as not to disturb single-mode and the input end has a greater area than the output end thereby concentrating the pump signal intensity therethrough;
    a coupler section coupled to receive the concentrated data signal intensity from the first tapered optical section and the concentrated pump signal intensity from the second tapered optical section; and
    means optically coupled to the coupler section having a sufficient length of optical transmissive material for optically amplifying the data signals by Raman effect.

2. An apparatus according to claim 1 further including:
    a third tapered optical portion optically coupled to the optically amplifying means at an input end and having a light transmissive portion interposed between the input end and an output end, the third tapered optical portion being fabricated so as not to disturb single-mode and the input end has a smaller area sized to correspond to the optically amplifying means and the output end which corresponds to the long-haul transmission link.

3. An apparatus according to claim 1 in which the optically amplifying means is fabricated from a material and has a small enough diameter so that the Raman effect is the stimulated Raman scattering for amplification of the data signals.

4. An apparatus according to claim 1, 2 or 3 in which the first and second tapered optical portions have input ends of about 8–10 microns and output ends of about 2–3 microns and the third tapered optical portion has an input end of about 2–3 microns and an output end of about 8–10 microns.

5. An apparatus according to claim 4 in which the first, second and third tapered optical portion are single-mode tapers.

6. An apparatus according to claims 1, 2 or 3 further including:
    a fourth tapered optical portion optically coupled to the long-haul communications link at an input end and having a light transmissive portion interposed between the input end and an output end, the fourth tapered optical portion being fabricated so as not to disturb single-mode and the input end has a larger area sized to correspond to the long-haul communications link and the output end which corresponds to a second wavelength selective coupler section;
    a fifth tapered optical portion optically coupled to transmit the data signals at an output end, and having a light transmission portion interposed between the input end and an output end, the fifth tapered optical portion being fabricated so as not to disturb single-mode and the output end has a greater area sized to correspond to a detector;
    a second source of optical pump signal;
    a sixth tapered optical portion optically coupled to receive the second optical pump signal at an input end and having a light transmissive portion interposed between the input end and an output end, the sixth tapered optical portion being fabricated as not to disturb single-mode and the input end has a greater area than the output end thereby concentrating the pump signal intensity therethrough;
    a coupler section coupled to receive the concentrated pump signal intensity from the sixth tapered optical portion and to transmit the data signal to the fifth tapered optical portion so that amplification is simultaneously forward and backward Raman amplified.

7. A method for amplifying optical data signals comprising:
    concentrating the intensity of the data signals through a first tapered optical portion fabricated so as not to disturb single mode;
    providing pump signals;
    concentrating the intensity of the pump signals through a second tapered optical portion fabricated so as not to disturb single mode;
    combining the concentrated data and pump signals in a single-mode coupler;
    confining the combined concentrated data signals and pump signals within a single-mode fiber having a lesser core diameter than a 8–10 micron long haul communications link;
    amplifying the data signals in this lesser core diametered single-mode fiber by stimulated Raman scattering.

8. An method according to claim 7 further including:
    interchanging the signal wavelength source with detector so that the amplification is backward Raman amplification of the data signals.

* * * * *